United States Patent
Ziemins et al.

(10) Patent No.: US 6,836,329 B1
(45) Date of Patent: Dec. 28, 2004

(54) REAL TIME IR OPTICAL SENSOR

(75) Inventors: Uldis A. Ziemins, Poughkeepsie, NY (US); Ray A. Reyes, New Windsor, NY (US); David L. Schmoke, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/604,303

(22) Filed: Jul. 9, 2003

(51) Int. Cl.7 .............................................. G01B 11/00
(52) U.S. Cl. ...................................... 356/399; 356/615
(58) Field of Search ................................ 356/213, 218, 356/219, 364, 399, 400, 614, 615

(56) References Cited

U.S. PATENT DOCUMENTS

| | | | |
|---|---|---|---|
| 4,208,636 A | 6/1980 | German | |
| 4,315,150 A | 2/1982 | Darringer et al. | |
| 4,330,208 A * | 5/1982 | Eloy | 356/399 |
| 4,769,530 A * | 9/1988 | Miyahara | 250/201.4 |
| 4,850,694 A | 7/1989 | Severinsson et al. | |
| 4,880,966 A | 11/1989 | Goodrich et al. | |
| 5,281,809 A * | 1/1994 | Anderson et al. | 250/221 |
| 5,629,767 A | 5/1997 | Tchejeyan | |
| 5,839,829 A | 11/1998 | Litvin et al. | |
| 5,843,831 A | 12/1998 | Chung et al. | |
| 5,859,707 A | 1/1999 | Nakagawa et al. | |
| 5,900,737 A * | 5/1999 | Graham et al. | 324/758 |
| 5,980,187 A * | 11/1999 | Verhovsky | 414/416.03 |
| 6,019,563 A * | 2/2000 | Murata et al. | 414/222.01 |
| 6,104,026 A | 8/2000 | Rueger | |
| 6,309,460 B1 * | 10/2001 | Makishi | 117/200 |
| 6,354,716 B1 * | 3/2002 | Chen et al. | 362/268 |
| 6,396,069 B1 * | 5/2002 | MacPherson et al. | 250/559.22 |
| 6,410,930 B1 | 6/2002 | Revelli, Jr. et al. | |
| 6,522,413 B2 * | 2/2003 | Opsal et al. | 356/364 |
| 2002/0005396 A1 | 1/2002 | Baird et al. | |
| 2003/0005561 A1 * | 1/2003 | Hahn et al. | 29/25.01 |

* cited by examiner

*Primary Examiner*—Zandra V. Smith
*Assistant Examiner*—Juan Valentin, II
(74) *Attorney, Agent, or Firm*—James J. Cioffi

(57) ABSTRACT

An apparatus and method to align an invisible light beam sensor, such as an IR sensor, utilizing a visible light beam such as a visible LED or HeNe laser, and provide the ability to visually monitor when the sensor needs adjustment in real time and avoid off line adjustments. Various embodiments synchronize and position both the invisible light beam and the visible light beam to travel the same path to a common desired location.

16 Claims, 8 Drawing Sheets

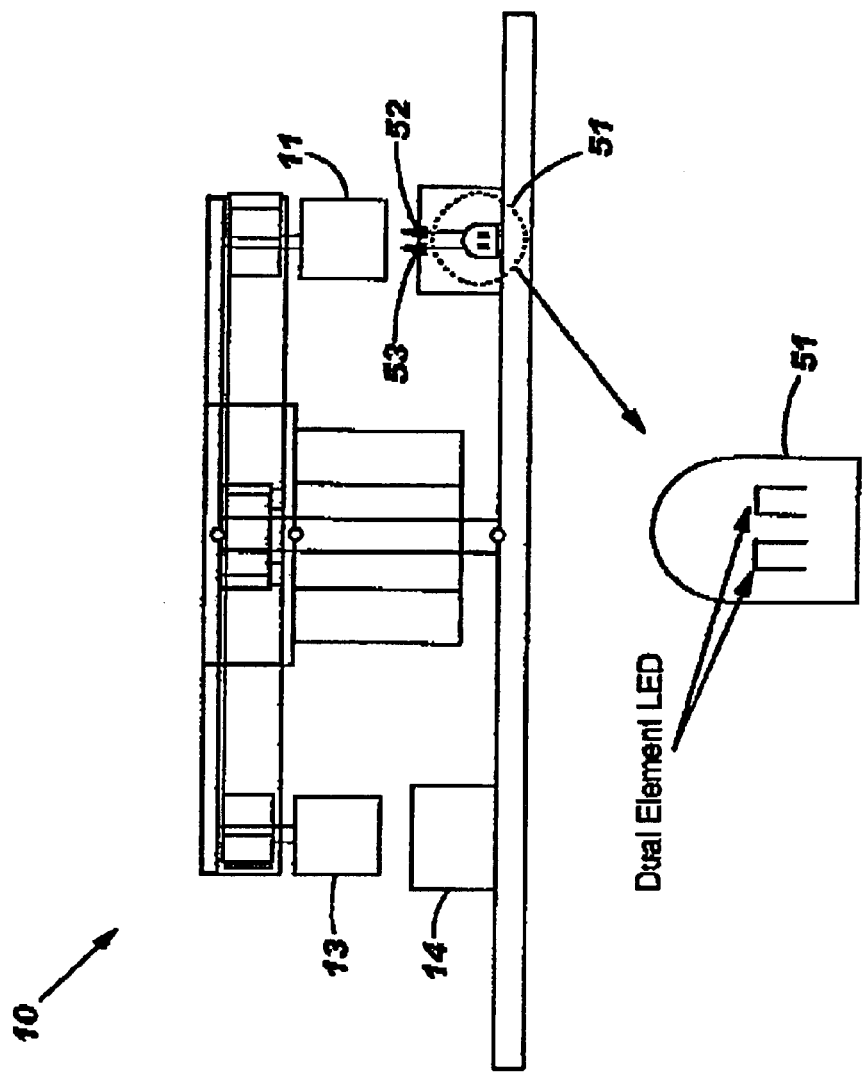

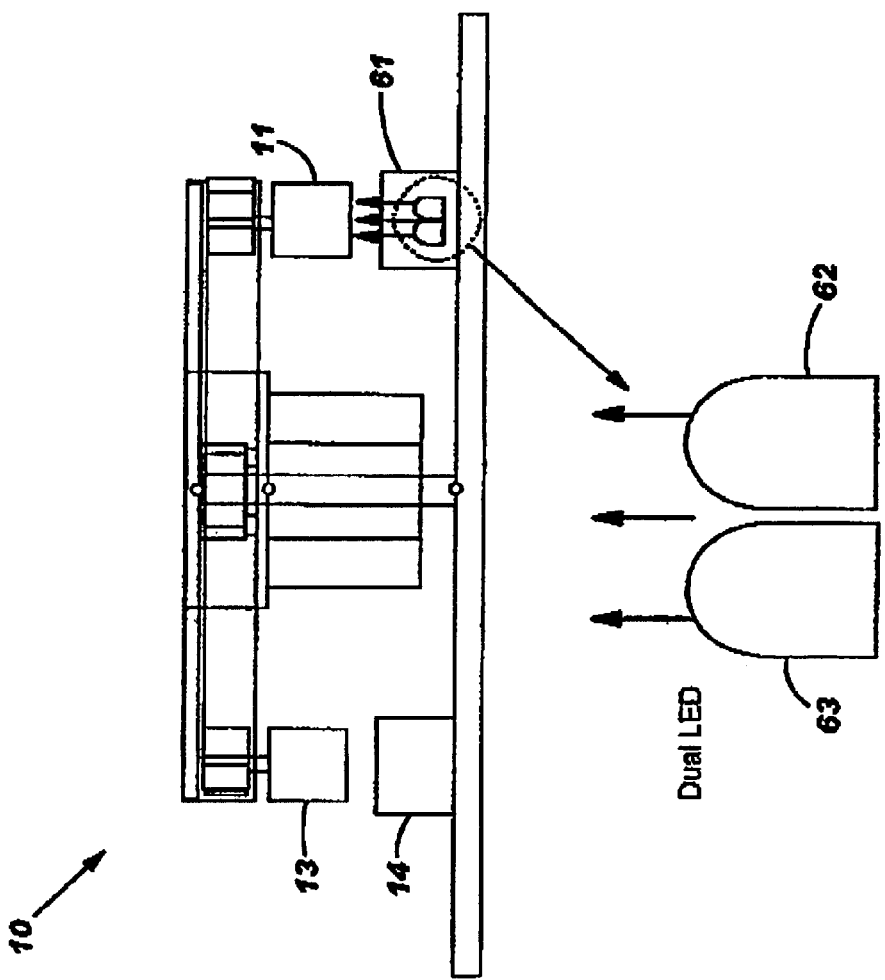

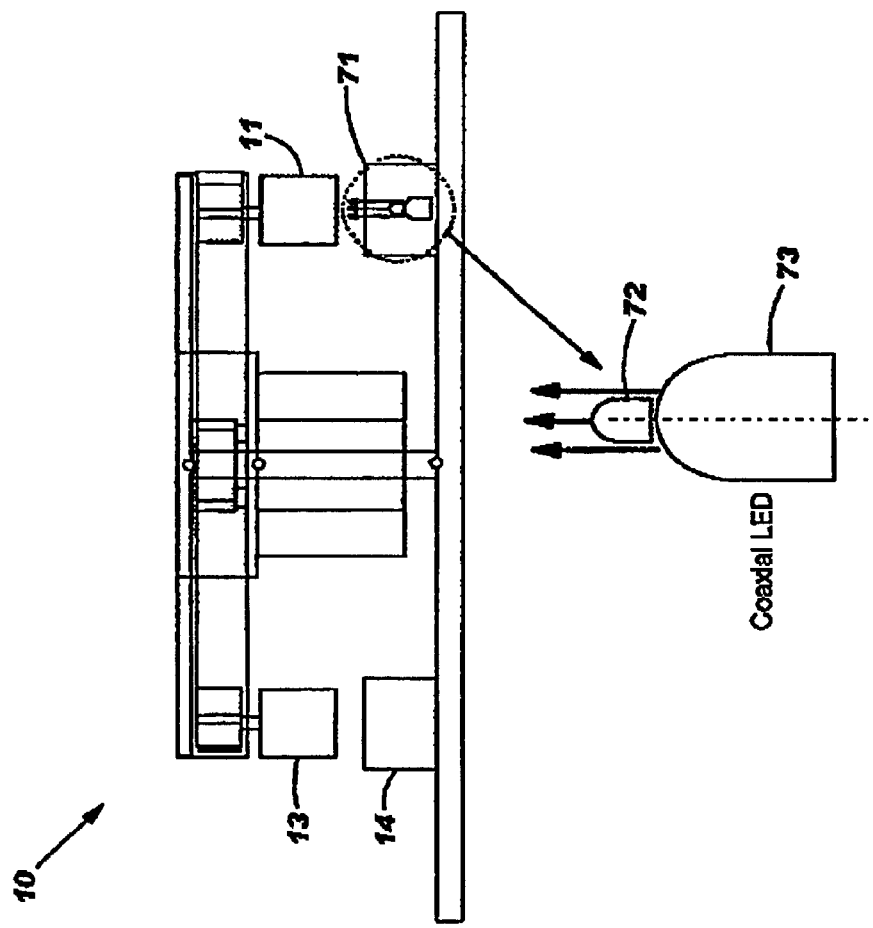

REAL TIME IR OPTICAL SENSOR

BACKGROUND OF INVENTION

The present invention is directed to the alignment of optical sensors and, more particularly, is directed to a method and apparatus for visually aligning an optical sensor such as an infrared laser where the laser operates outside the visible spectrum.

The use of optical sensors where the laser operates outside the visible spectrum is common in many industrial applications as well as consumer applications such as hand held remote controllers for TV, stereo etc.

Automated sensing equipment using invisible optical sensors is being increasingly integrated into industrial and manufacturing facilities. A typical example is the overhead infrared (IR) sensing vehicle shown in FIG. 1. This particular vehicle is used to transport semiconductor wafers in an automated clean room semiconductor wafer facility. Each vehicle contains IR sensors which project a three dimensional cone of light. For simplicity, such a three dimensional cone of light will hereafter be referred to as a "beam". The sensors are used in the safety and guidance of the moving vehicles. Any disruption in the IR beam will stop the motion of the vehicle.

Referring again to FIG. 1, an initial sensor alignment and then periodic alignment checks are currently required to determine proper beam alignment and operation of the unit. A typical unit will utilize an IR light emitting diode (LED), for example, emitting light at a wavelength of approximately 870 nanometers. The human eye is unable to detect this wavelength and therefore reference fixtures or other detectors are required to align the sensors.

This inability to visually monitor the sensor alignment requires that the unit be taken out of normal manufacturing operation for periodic monitoring using fixtures or jigs to check the beam alignment. What is needed is the ability to perform in-situ or real time checks on the sensor beam alignment, while the unit is in normal manufacturing operation, to eliminate costly interruption of the manufacturing operation.

Accordingly, it is a purpose of the present invention to provide an apparatus and method to align an invisible light beam sensor utilizing a visible light beam such as a visible LED or HeNe laser.

It is another purpose of the present invention to provide the ability to align and periodically adjust invisible light beam sensors without fixtures or jigs.

It is another purpose of the present invention to provide the ability to visually monitor when the sensor needs adjustment in real time and avoid off line adjustments.

It is another purpose of the present invention to achieve faster alignment and more repeatable alignments utilizing the visible wavelength.

These and other purposes of the present invention will become more apparent after referring to the following description considered in conjunction with the accompanying drawings.

SUMMARY OF INVENTION

The purposes and advantages of the present invention have been achieved by providing, according to a first embodiment of the invention an apparatus for performing alignment and monitoring of optical sensors comprising: an invisible light source, such as an infrared or ultraviolet laser, emitting an invisible light beam; a visible light source, such as a He—Ne laser, emitting a visible light beam and positioned opposite from and approximately coaxial with the invisible light source; an optical polarizing beam splitter having an outer reflecting surface and an inner reflecting surface, the outer reflecting surface reflecting approximately 100% of the invisible light beam and the inner reflecting surface reflecting approximately 50% of the visible light beam in the same path as the invisible light beam, the optical polarizing beam splitter positioned between and approximately coaxial with both the invisible light source and the visible light source; and an optical detector positioned opposite and approximately coaxial with the outer reflecting surface to collect both the reflected invisible and visible light beams.

The apparatus may further comprise a motor connected to the optical beam splitter, which may be rotatable, with a rotatable shaft having a longitudinal opening concentric with its axis of rotation; and the visible light source positioned approximately coaxial with the longitudinal opening.

According to another embodiment of the invention there is provided an apparatus for performing alignment and monitoring of optical sensors comprising: an invisible light source; a visible light source; a reflecting mirror; means for alternatively shuttling the visible light source and the invisible light source in optical alignment with the reflecting mirror, and an optical detector positioned opposite and approximately coaxial with the reflecting mirror.

According to another embodiment of the invention there is provided an apparatus for performing alignment and monitoring of optical sensors comprising: an invisible light source emitting an invisible light beam; a visible light source emitting a visible light beam and positioned opposite and approximately coaxial to the invisible light source; a dual mirror assembly positioned between and approximately coaxial with the visible light source and the invisible light source, the dual mirror assembly having a first side opposite the invisible light source and a second side opposite the visible light source such that in operation the invisible light beam and the visible light beam are both reflected and converge at a common point; a reflecting mirror positioned in alignment with the common point such that both the invisible light beam and the visible light beam are reflected in the same direction; and an optical detector positioned opposite and approximately coaxial with the reflecting mirror to collect both the invisible light beam and the visible light beam.

According to another embodiment of the invention there is provided an apparatus for performing alignment and monitoring of optical sensors comprising: a laser emitting diode having a visible light source and an invisible light source such that the laser emitting diode emits both a visible light beam and an invisible light beam; a reflecting mirror positioned opposite and approximately coaxial with the laser emitting diode; and an optical detector positioned opposite and approximately coaxial with the reflecting mirror to collect both the invisible light beam and the visible light beam.

In one aspect of this embodiment the laser emitting diode is a dual element laser emitting diode which emits a visible laser beam and an invisible laser beam from the same component. In another aspect of this embodiment the light emitting diode is a dual light emitting diode comprising a visible laser source and an invisible laser source positioned adjacent to each other. In another aspect of this embodiment the light emitting diode is a coaxial light emitting diode comprising a visible laser source aligned directly in front of or behind an invisible laser source.

According to another aspect of the invention there is provided a method for performing alignment and monitoring of optical sensors comprising the steps of: providing an invisible light source emitting an invisible light beam; positioning a visible light source emitting a visible light beam opposite from and approximately coaxial with the invisible light source; positioning an optical polarizing beam splitter between and approximately coaxial with the invisible light source and the visible light source, the optical polarizing beam splitter having an outer reflecting surface and an inner reflecting surface, the outer reflecting surface reflecting approximately 100% of the invisible light beam and the inner reflecting surface reflecting approximately 50% of the visible light beam in the same path as the invisible light beam; and positioning an optical detector opposite and approximately coaxial with the outer reflecting surface to collect both the reflected invisible and visible light beams.

The method may further comprise the steps of connecting a motor to the optical beam splitter, which may be rotatable, with a rotatable shaft, the rotatable shaft having a longitudinal opening concentric with its axis of rotation; and positioning the visible light source approximately coaxial with the longitudinal opening.

According to another embodiment of the invention there is provided a method for performing alignment and monitoring of optical sensors comprising the steps of: providing an invisible light source, a visible light source and a reflecting mirror; providing means for alternatively shutting the visible light source and the invisible light source in optical alignment with the reflecting mirror; and positioning an optical detector opposite and approximately coaxial with the reflecting mirror.

According to another embodiment of the invention there is provided a method for performing alignment and monitoring of optical sensors comprising the steps of: providing an invisible light source emitting an invisible light beam; positioning a visible light source emitting a visible light beam opposite and approximately coaxial to the invisible light source; positioning a dual mirror assembly between and approximately coaxial with the visible light source and the invisible light source, the dual mirror assembly having a first side opposite the invisible light source and a second side opposite the visible light source such that in operation the invisible light beam and the visible light beam are both reflected and converge at a common point; positioning a reflecting mirror in alignment with the common point such that both the invisible light beam and the visible light beam are reflected in the same direction; and positioning an optical detector opposite and approximately coaxial with the reflecting mirror to collect the invisible light beam and the visible light beam.

According to another embodiment of the invention there is provided a method for performing alignment and monitoring of optical sensors comprising the steps of: providing a laser emitting diode having a visible light source and an invisible light source such that the laser emitting diode emits both a visible light beam and an invisible light beam; positioning a reflecting mirror opposite and approximately coaxial with the laser emitting diode; and positioning an optical detector opposite and approximately coaxial with the reflecting mirror to collect both the invisible light beam and the visible light beam. The laser emitting diode may be a dual element laser emitting diode which emits a visible laser beam and an invisible laser beam from the same component, a dual light emitting diode comprising a visible laser source and an invisible laser source positioned adjacent to each other, or a coaxial light emitting diode comprising a visible laser source aligned directly in front of or behind an invisible laser source.

BRIEF DESCRIPTION OF DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

FIG. 6 is a schematical view of an overhead IR sensing vehicle including a dual element LED in accordance with an embodiment of the invention.

FIG. 7 is a schematical view of an overhead IR sensing vehicle including a dual LED in accordance with an embodiment of the invention.

FIG. 8 is a schematical view of an overhead IR sensing vehicle including a coaxial LED in accordance with an embodiment of the invention.

DETAILED DESCRIPTION

Figure 1:
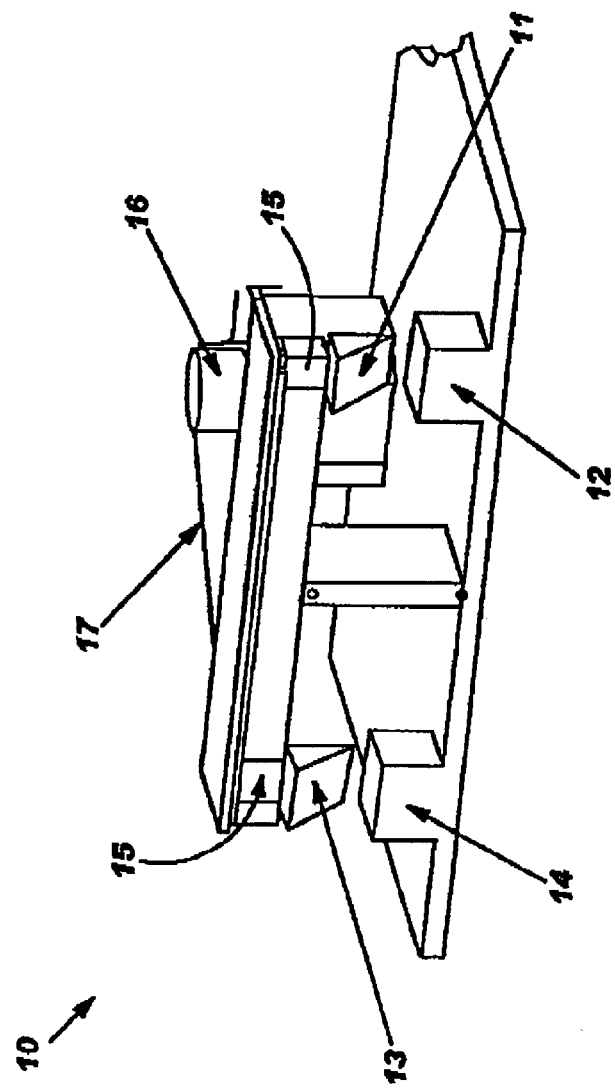
FIG. 1 is a perspective view of a conventional overhead IR sensing vehicle.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In a first embodiment of the present invention there is disclosed the use of an IR light source in conjunction with a visible light source to perform insitu alignment and monitoring of the invisible IR beam. Referring again FIG. 1 there is a shown an IR sensor unit 10 used in a conventional System Resource Controller (SRC) overhead vehicle. The invisible IR beam (not shown) originates from a conventional IR LED source 12. An example of a typical IR LED source is an 870 nm wavelength Lambda Physik LED. The human eye is unable to detect this wavelength and therefore reference fixtures or other detectors are required to align the sensors.

The IR beam is emitted from stationary source 12 and is reflected from a reflecting scanning mirror 11. There are optics between the source 12 and reflecting scanning mirror 11 which collimate and process the beam, which are common in the art, that are not shown. Such optics are well known and need not be described further herein. A drive motor 16 turns a drive shaft 15 which operates a drive belt 17 coupled to the reflecting scanning mirror 11 which causes the reflecting scanning mirror 11 to swing back and forth with a regular motion.

As the reflecting scanning mirror 11 oscillates, the reflected IR beam (not shown) from source 12 propagates out to a predetermined scan angle and intensity to be reflected from any object in its path. The reflected beam is then captured by a synchronized scanning mirror 13 which is also coupled to drive motor 16. The synchronized scanning mirror 13 is a reflecting mirror which oscillates in synchronization with reflecting scanning mirror 11. The synchronized scanning mirror 13 captures reflected IR light from any detected object and irradiates an optical detector 14. From the optical detector 14 signals are processed and the electronics, which are not shown and are well known in the art, impedes or stops forward progress of the vehicle.

The initial alignment of the IR beam is currently performed using a viewing scope. Typical IR or ultraviolet (UV) viewing scopes employ a high resolution image converter and photocathode arrangement to produce a visible image from invisible radiation. This alignment, and any subsequent monitoring, can only be performed when the unit is off line. The use of a viewing scope requires that the adjustment be performed while the unit is stationary. As discussed previously, it would be very advantageous to perform in-situ checks of the equipment to eliminate costly interruption of the manufacturing facility.

Figure 2:
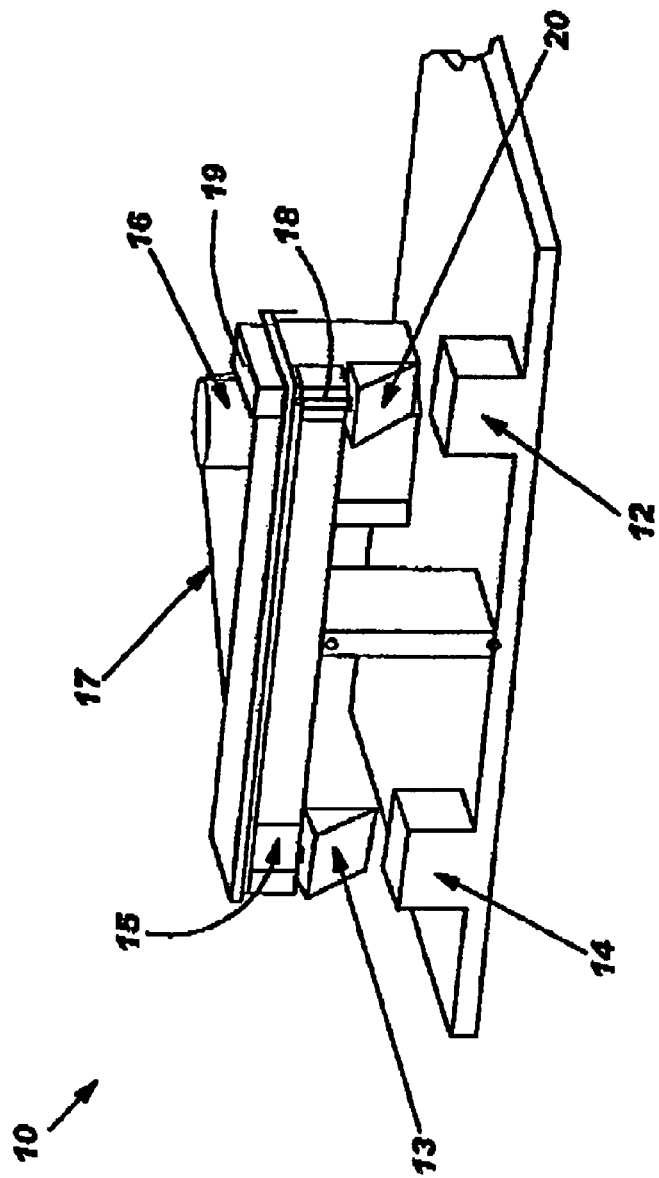
FIG. 2 is a perspective view of an overhead IR sensing vehicle including a visible light source and polarizing beam splitter in accordance with an embodiment of the invention.

Referring now to FIG. 2 a visible alignment and tracking means is provided by the present invention to accomplish this task in real time. A visible light source 19 is positioned opposite from and approximately coaxial with the stationary IR source 12. In the particular embodiment shown in FIG. 2, the visible light source 19 is also positioned above a hollow drive motor shaft 18. The hollow drive motor shaft 18 replaces the drive motor shaft 15 shown in FIG. 1. This is to allow visible light from the visible light source 19, for example He—Ne laser radiation, to coaxially travel down the shaft and irradiate visible radiation on a polarizing beam splitter 20. The polarizing beam splitter 20 replaces the scanning mirror 11 shown in FIG. 1. The polarizing beam splitter 20 is positioned between and approximately coaxial with the visible light source 19 and stationary IR source 12.

Figure 3:
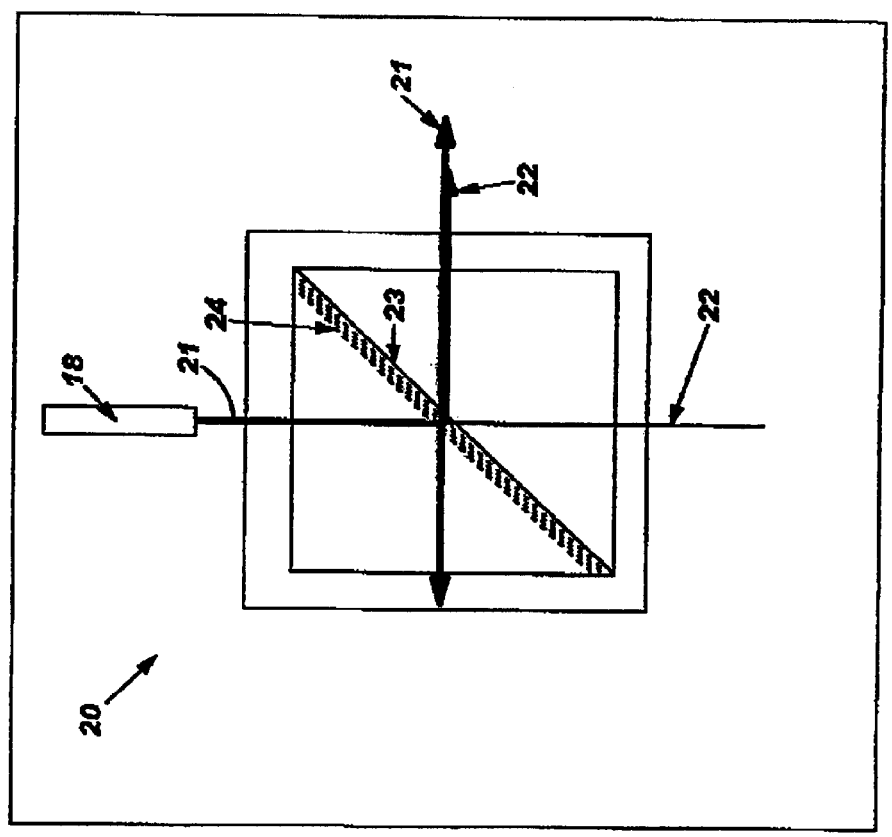
FIG. 3 is a schematical view of a polarizing beam splitter positioned between a visible and invisible light source in accordance with an embodiment of the invention.

The polarizing beam splitter 20, shown in more detail in FIG. 3, is well known in the optical field. It consists of an outer invisible light reflective surface 23 which will reflect approximately 100% of the incident invisible light beam 22, in this embodiment an IR beam, at a positive 90° angle. It also has an inner surface 24 which is coated with a suitable coating material which will split the visible light beam 21, in this example He—Ne radiation, with approximately 50% of the visible light beam reflected at a positive 90° angle and approximately 50% of the visible light beam reflected at a negative 90° angle. Such coating materials are well known in the art and have a horizontal or vertical polarization which is optimized to pass one or the other light wave.

Referring again to FIG. 2, substituting the polarizing beam splitter 20 for the scanning mirror 11, and mounting and configuring the polarizing beam splitter 20 between visible light source 19 and IR source 12, allows the visible He—Ne radiation (or other visible collimated light) to be projected to combine and travel the same path as the IR radiation after reflection from polarizing beam splitter 20. An optical detector, not shown, is positioned opposite and approximately coaxial with the invisible light reflecting surface 23 of the optical polarizing beam splitter. In this embodiment the polarizing beam splitter is rotatable, coupled to a motor by a rotating shaft in a similar manner as the scanning mirror shown in FIG. 1. However in this embodiment the rotatable shaft 18 is hollow, i.e., the rotatable shaft 18 has a longitudinal opening concentric with its axis of rotation. The visible light source 19 is positioned above approximately coaxial with the rotatable shaft 18 to allow the visible light beam 21 to pass through the longitudinal opening.

As illustrated in FIG. 3, approximately 50% of the visible light beam 21 and approximately 100% of the IR light beam 22 is reflected from polarizing beam 20 to be collected by an optical detector (not shown). The present invention therefore implements a beam splitter cube which allows the IR wavelength to pass and reflects the visible wavelength in unison, therefore allowing an individual to visually view the sensor output and align the sensor correctly. Initially the IR and visible wavelengths combine at the beam splitter where they overlay on top of each other and therefore represent the optical path of both wavelengths.

The two beams can be aligned by turning on the light source 19 and viewing the IR radiation with an IR viewer as discussed previously. By viewing the IR radiation and visible radiation the two optical paths can be aligned accurately and in real time. The IR viewer has certain limitations in contrast; range and resolution of the IR beam thereby making it a good initial alignment tool and then utilizing the visible light source 19 to be the in-situ resolving means.

Figure 4:
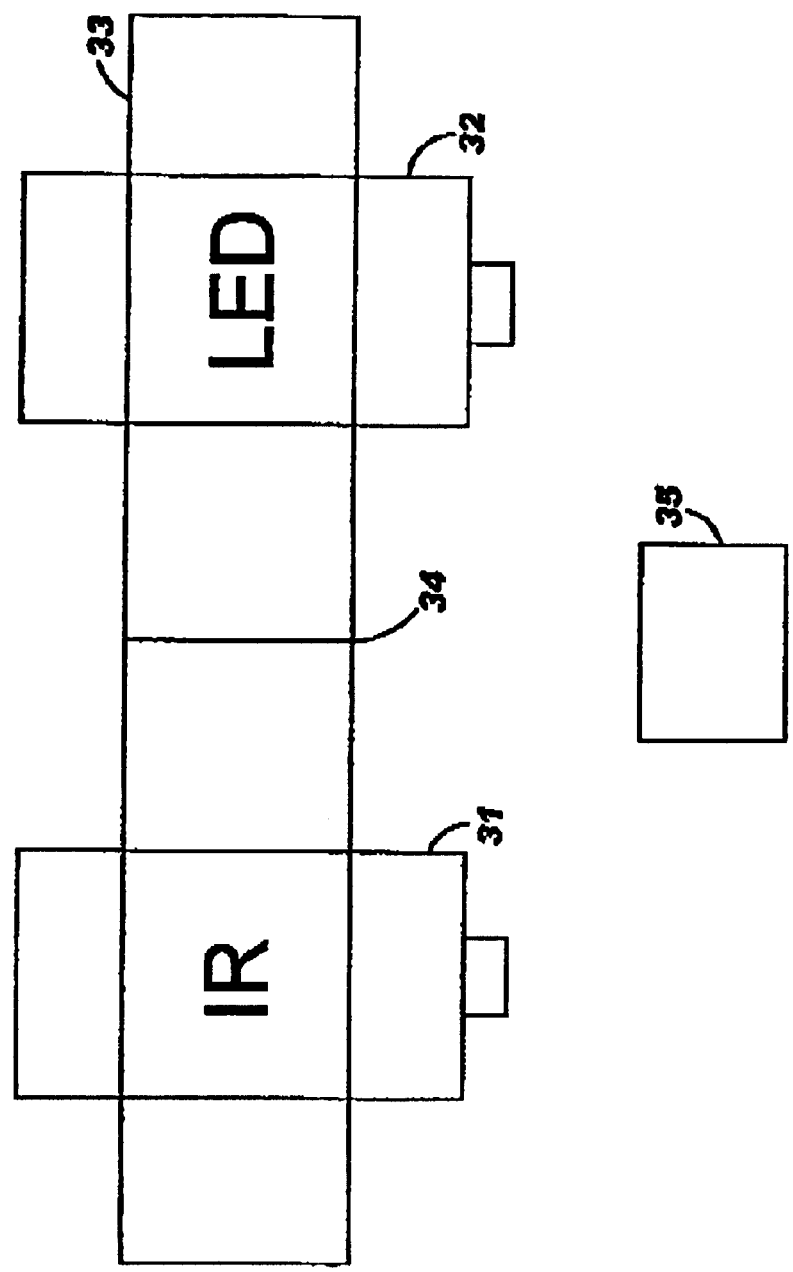
FIG. 4 is a schematical view of a shuttle mechanism installed in a sensor unit in accordance with an embodiment of the invention.

Referring to FIG. 4 there is illustrated another embodiment of the present invention which shows another means of incorporating a visible light alignment path to an invisible light path. In this embodiment a shuttle mechanism 33 is installed in the sensor unit to position either the visible light source 32 or invisible light source 31 in the desired alignment position 34.

Both the invisible light source 31, in this particular example an IR LED, and visible light source 32, for example an LED, laser diode, or collimated light source, are superimposed by the use of a shuttle mechanism 33 to position the invisible light source 31 or the visible light source 32 in the desired optical sensor position 34. The shuttle mechanism 33 is preferably a shuttle or slide mechanism which can be configured and actuated in various ways and is not pertinent to the invention. A person of ordinary skill in the mechanical arts will recognize numerous ways to provide a shuttle mechanism 33 which can accurately and repeatably provide alignment between a visible light source 32 and a reflecting mirror 35 or other target, and then shuttle or move the invisible light source to the same location 34 and have the two beams align spatially and coaxially to the predetermined target 35. Initial alignment can be accomplished with an invisible viewer as previously discussed. Preferably the alignment is accomplished with a visible LED and then the IR LED is shuttled back into the exact location to align in the same optical path.

Figure 5:
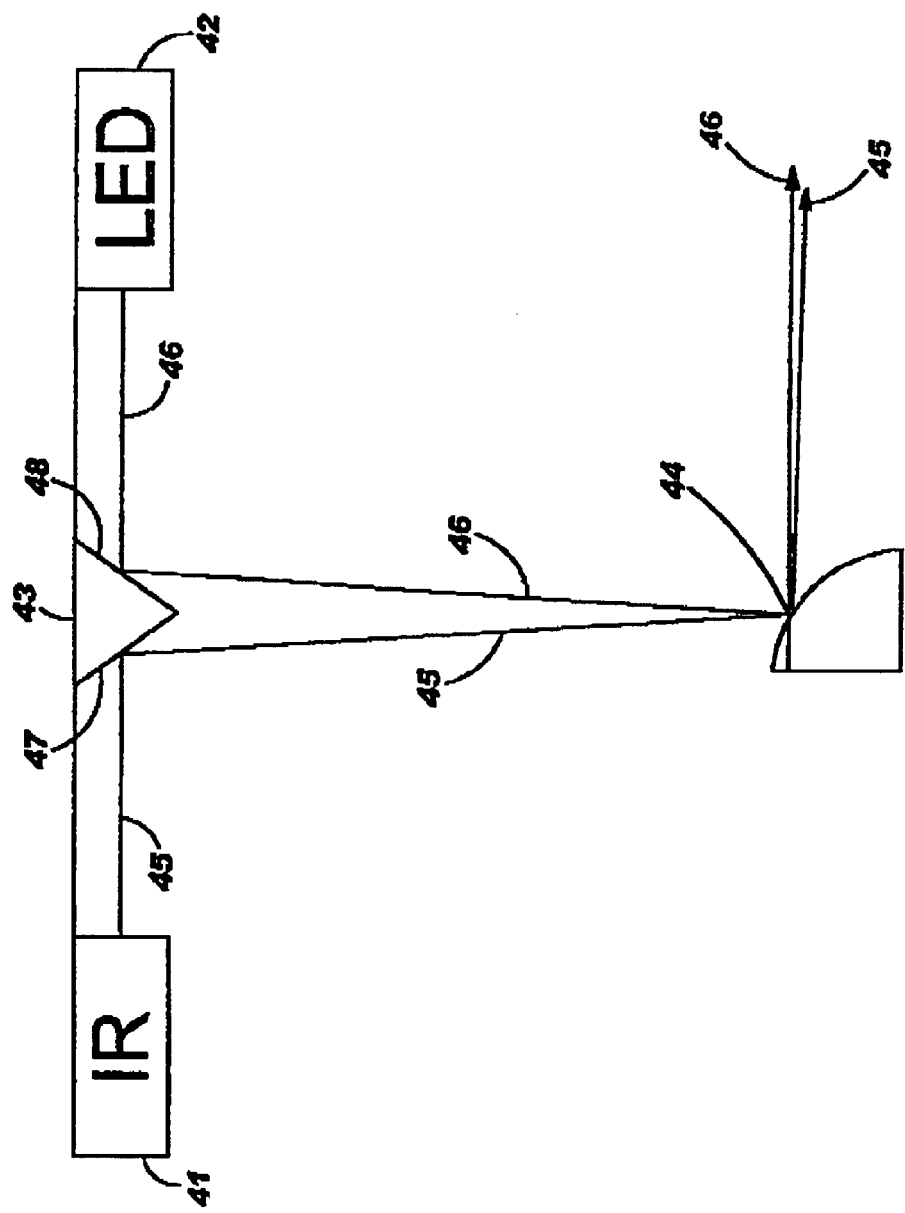
FIG. 5 is a schematical view of a dual mirror positioned in a sensor unit in accordance with an embodiment of the invention.

Referring now to FIG. 5 there is illustrated another embodiment of the present invention. An invisible light source 41 and a visible light source 42 are positioned coaxially with respect to each other and a single focal dual mirror 43 is positioned coaxially between them. The dual mirror assembly 43 has a first side 47 opposite the invisible light source 41 and a second side 48 opposite the visible light source 42.

In this embodiment both the invisible light beam 45 and the visible light beam 46 are diverged 90 degrees by the dual mirror assembly 43 to spatially align both the visible light beam 46 and invisible light beam 45 at the same predetermined location 44. In a preferred embodiment the opposite reflecting surfaces of the dual mirror assembly will have a different reflective coating to achieve the desired spatial alignment. The invisible light beam 45 and visible light beam 46 are typically collimated, but can be set at the desired focal length and aligned by the use of various optics well known in the art. In the particular example shown in FIG. 5 the predetermined location 44 is a reflecting mirror similar the reflecting mirror illustrated in FIG. 1.

In another embodiment of the present invention a dual element LED is used that can illuminate in both the visible and invisible wavelengths to provide both visible light and IR light from the same source. Referring to FIG. 6 there is a shown an IR sensor unit 10 as illustrated in FIG. 1. In this embodiment the stationary IR source 12 is replaced with a dual element LED 51 positioned opposite and approximately coaxial with a reflecting mirror 11. The dual element LED 51 projects a visible light beam 52 along with the invisible IR laser 53 from the same component. Another embodiment of the present invention is shown in FIG. 7. Here the IR sensor unit 10 as illustrated in FIG. 1 is shown, but now the stationary IR source 12 is replaced with a dual LED 61 with known offset. The dual LED 61 involves the use of two independent light sources, invisible light source 62 and visible light source 63, mounted side by side simulating the function of the dual element LED 51.

Another embodiment of the present invention is shown in FIG. 8. In this embodiment alignment is accomplished with the use of a visible laser aligned directly in front of or behind the IR LED which would again simulate the optical path in a visible means to ascertain direct alignment. Here the IR sensor unit 10 as illustrated in FIG. 1 is shown, but now the stationary IR source 12 is replaced with a coaxial LED 71. The coaxial LED 71 uses two independent light sources, invisible light source 72 and visible light source 73, mounted coaxially to provide an encompassing area of visible light 74 around the projected area of invisible light 75.

In all the various embodiments discussed above the problem solved by this invention is the ability to align an invisible sensor, such as IR or UV wavelength light, utilizing a visible means such as a visible LED or HeNe laser. The present invention accomplishes this using a green, red or other visible light source to align the invisible light to the required location.

The advantage realized by the present invention is the ability in real time to align and periodically adjust the IR sensors without fixtures or jigs. Another advantage is the ability to see when the sensor needs adjustment in real time and not perform unnecessary adjustments. Another advantage is to achieve much faster alignment and more repeatable alignments utilizing the visible wavelength. It will be apparent to those skilled in the art having regard to this disclosure that other modifications of this invention beyond those embodiments specifically described here may be mad without departing from the spirit of the invention. Accordingly, such modifications are considered within the scope of the invention as limited solely by the appended claims.

What is claimed is:

1. An apparatus for performing alignment and monitoring of optical sensors comprising:

an invisible light source emitting an invisible light beam;

a visible light source emitting a visible light beam and positioned opposite from and approximately coaxial with said invisible light source;

an optical polarizing beam splitter having an outer reflecting surface and an inner reflecting surface, said outer reflecting surface reflecting approximately 100% of said invisible light beam and said inner reflecting surface reflecting approximately 50% of said visible light beam in the same path as said invisible light beam, said optical polarizing beam splitter positioned between and approximately coaxial with said invisible light source and said visible light source; and an optical detector positioned opposite and approximately coaxial with said outer reflecting surface to collect both said reflected invisible and visible light beams.

2. The apparatus of claim 1 wherein said optical polarizing beam splitter is rotatable.

3. The apparatus of claim 2, further comprising:

a motor connected to said rotatable optical beam splitter with a rotatable shaft, said rotatable shaft having a longitudinal opening concentric with its axis of rotation; and said visible light source positioned approximately coaxial with said longitudinal opening.

4. The apparatus of claim 1 wherein said visible light source is a He—He laser.

5. The apparatus of claim 1 wherein said invisible light source is an infrared laser.

6. The apparatus of claim 1 wherein said invisible light source is an ultraviolet laser.

7. An apparatus for performing alignment and monitoring of optical sensors comprising:

an invisible light source;

a visible light source;

a reflecting mirror;

means for alternatively shuttling said visible light source and said invisible light source in optical alignment with said reflecting mirror, and an optical detector positioned opposite and approximately coaxial with said reflecting mirror.

8. An apparatus for performing alignment and monitoring of optical sensors comprising:

an invisible light source emitting an invisible light beam;

a visible light source emitting a visible light beam and positioned opposite and approximately coaxial to said invisible light source;

a dual mirror assembly positioned between and approximately coaxial with said visible light source and said invisible light source, said dual mirror assembly having a first side opposite said invisible light source and a second side opposite said visible light source such that in operation said invisible light beam and said visible light beam are both reflected and converge at a common point;

a reflecting mirror positioned in alignment with said common point such that both said invisible light beam and said visible light beam are reflected in the same direction; and an optical detector positioned opposite and approximately coaxial with said reflecting mirror to collect said invisible light beam and said visible light beam.

9. A method for performing alignment and monitoring of optical comprising the steps of:

providing an invisible light source emitting an invisible light beam;

positioning a visible light source emitting a visible light beam opposite from and approximately coaxial with said invisible light source;

positioning an optical polarizing beam splitter between and approximately coaxial with said invisible light source and said visible light source, said optical polarizing beam splitter having an outer reflecting surface and an inner reflecting surface, said outer reflecting surface reflecting approximately 100% of said invisible light beam and said inner reflecting surface reflecting approximately 50% of said visible light beam in the same path as said invisible light beam; and positioning an optical detector opposite and approximately coaxial with said outer reflecting surface to collect both said reflected invisible and visible light beams.

10. The method of claim 9 wherein said optical polarizing beam splitter is rotatable.

11. The method of claim 9 further comprising the steps of:

connecting a motor to said rotatable optical beam splitter with a rotatable shaft, said rotatable shaft having a longitudinal opening concentric with its axis of rotation; and positioning said visible light source approximately coaxial with said longitudinal opening.

12. The method of claim 9 wherein said visible light source is a He—Ne laser.

13. The method of claim 9 wherein said invisible light source is an infrared laser.

14. The method of claim 9 wherein said invisible light source is an ultraviolet laser.

15. A method for performing alignment and monitoring of optical sensors comprising the steps of:

providing an invisible light source, a visible light source and a reflecting mirror;

providing means for alternatively shuttling said visible light source and said invisible light source in optical alignment with said reflecting mirror; and positioning an optical detector opposite and approximately coaxial with said reflecting mirror.

16. A method for performing alignment and monitoring of optical sensors comprising the steps of:

providing an invisible light source emitting an invisible light beam;

positioning a visible light source emitting a visible light beam opposite and approximately coaxial to said invisible light source:

positioning a dual mirror assembly between and approximately coaxial with said visible light source and said invisible light source, said dual mirror assembly having a first side opposite said invisible light source and a second side opposite said visible light source such that in operation said invisible light beam and said visible light beam are both reflected and converge at a common point;

positioning a reflecting mirror in alignment with said common point such that both said invisible light beam and said visible light beam are reflected in the same direction; and positioning an optical detector opposite and approximately coaxial with said reflecting mirror to collect said invisible light beam and said visible light beam.

* * * * *